H. P. COPE.
VEHICLE CHOCK.
APPLICATION FILED SEPT. 17, 1914.
1,153,607.
Patented Sept. 14, 1915.
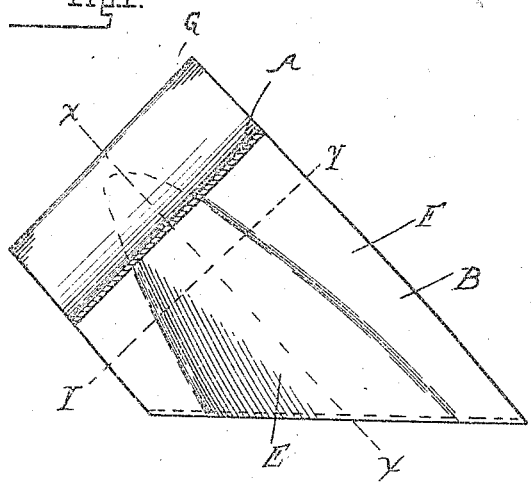
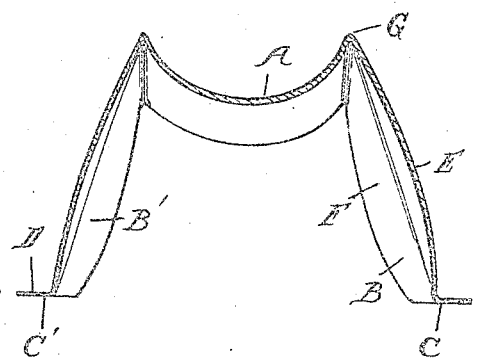
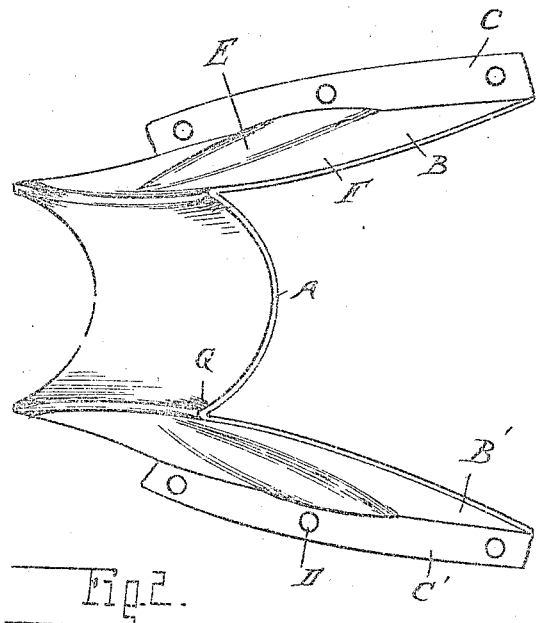
WITNESSES:
W. K. Ford
James P. Barry
INVENTOR
Henry P. Cope.
BY
Whittemore Hulbert & Whittemore
ATTORNEYS

UNITED STATES PATENT OFFICE.

HENRY P. COPE, OF DETROIT, MICHIGAN, ASSIGNOR TO MICHIGAN STAMPING COMPANY, OF DETROIT, MICHIGAN, A CORPORATION OF MICHIGAN.

VEHICLE-CHOCK.

1,153,607.   Specification of Letters Patent.   Patented Sept. 14, 1915.

Application filed September 17, 1914. Serial No. 862,125.

*To all whom it may concern:*

Be it known that I, HENRY P. COPE, a citizen of the United States of America, residing at Detroit, in the county of Wayne and State of Michigan, have invented certain new and useful Improvements in Vehicle-Chocks, of which the following is a specification, reference being had therein to the accompanying drawings.

The invention relates to vehicle wheel chocks and comprises the novel construction as hereinafter set forth.

In the drawings: Figure 1 is a central longitudinal section through the chock; Fig. 2 is a plan view thereof; Fig. 3 is a section on line x—x Fig. 1; and Fig. 4 is a section on line y—y Fig. 1.

It is the particular object of the invention to obtain a construction of chock that may be formed from a flat blank of sheet metal and which possesses a high degree of strength and rigidity. To this end the blank is so fastened as to form a central concave bearing segment A and return-bent portions B and B' at opposite sides thereof, which extend obliquely to the supporting base and substantially perpendicular to the axis of the segment. The portions B and B' terminate at their lower ends in outwardly-turned flanges C and C' suitably apertured as at D for the engagement of bolts or securing means to the floor.

To increase the strength of the structure the sections B and B' are flared outwardly from the segmental bearing to the base and each is fashioned in transverse section so as to form a truss. As shown in Fig. 4, the portion B is centrally bowed outward at E, and the portions F on opposite sides thereof are bowed inward, thereby reinforcing and bracing each other. The bearing segment A has its end portions G rounded outward so as to avoid any sharp corner which might impinge against the wheel tire and to assist in guiding the wheel into the bearing.

With the construction as described the side portions B and B' extend longitudinally in the direction of maximum stress from the wheel load applied to the segment A. Furthermore, the securing base flanges C, being located outside of the position of the segmental bearing, there will be no tendency to tilt the chock or to lift the bolts or securing devices from their engagement with the base. Thus an exceptionally strong and rigid structure is obtained, and as this is struck up from a flat blank without complicated bends, the cost of manufacture is low.

What I claim as my invention is:—

1. A vehicle wheel chock, formed from sheet metal, having a cylindrical concave bearing segment and return-bent portions on opposite sides of said segment and for the complete length thereof, the edges of said return-bent portions extending substantially at right angles to the axis of the cylindrical concave bearing portion and obliquely to the supporting base.

2. A vehicle chock comprising a sheet metal member having a central concave bearing segment, return-bent portions upon opposite sides of said segment and for the complete length thereof, the edges of said return-bent portions extending obliquely to the supporting base, and out-turned flanges at the lower ends of said return-bent portions parallel to the supporting base.

3. A vehicle wheel chock, comprising a member formed from sheet metal having a central cylindrical concave bearing segment, return-bent portions upon opposite sides thereof and for the complete length thereof, the edges of said return-bent portions extending at substantially right angles to the axis of said cylindrical concave bearing segment and obliquely to the supporting base, said return-bent portions being fashioned in cross-section to produce a rigid brace.

4. A vehicle wheel chock, comprising a member formed from sheet metal having a central portion forming a concave bearing segment, return-bent portions on opposite sides thereof and for the complete length thereof, said return-bent portions flaring outward and the edges thereof extending obliquely to the plane of the supporting base, said return-bent portions being corrugated in cross-section to form rigid braces, and outwardly-extending flanges at the lower ends of said return-bent portions parallel to the base.

In testimony whereof I affix my signature in presence of two witnesses.

HENRY P. COPE.

Witnesses:
ADELAIDE I. ADAMS,
JAMES P. BARRY.